United States Patent
Wang et al.

(10) Patent No.: US 11,120,565 B2
(45) Date of Patent: Sep. 14, 2021

(54) IMAGE REGISTRATION METHOD, IMAGE REGISTRATION DEVICE AND STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yunqi Wang, Beijing (CN); Huidong He, Beijing (CN); Minglei Chu, Beijing (CN); Lili Chen, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 136 days.

(21) Appl. No.: 16/503,832

(22) Filed: Jul. 5, 2019

(65) Prior Publication Data
US 2020/0134845 A1  Apr. 30, 2020

(30) Foreign Application Priority Data

Oct. 30, 2018  (CN) .......................... 201811276677.2

(51) Int. Cl.
*G06T 7/33* (2017.01)
*G06T 7/73* (2017.01)
(Continued)

(52) U.S. Cl.
CPC ................ *G06T 7/337* (2017.01); *G06F 3/14* (2013.01); *G06T 7/001* (2013.01); *G06T 7/74* (2017.01);
(Continued)

(58) Field of Classification Search
None
See application file for complete search history.

(56) References Cited

U.S. PATENT DOCUMENTS

| 10,681,344 B2 * | 6/2020 | Zhang .................. G06T 7/0004 |
| 2009/0238432 A1 * | 9/2009 | Can ........................ G06T 7/001 382/132 |

FOREIGN PATENT DOCUMENTS

| CN | 104732900 A | 6/2015 |
| CN | 106228535 A | 12/2016 |

(Continued)

OTHER PUBLICATIONS

First Chinese Office Action from corresponding Chinese Application No. 201811276677.2 dated Jul. 3, 2020.
(Continued)

*Primary Examiner* — Fayyaz Alam
(74) *Attorney, Agent, or Firm* — Dilworth & Barrese, LLP.; Michael J. Musella, Esq.

(57) ABSTRACT

An image registration method, an image registration device, and a storage medium. The image registration method includes: causing a display device to display at least one spot array; obtaining a feature image, and performing a feature-based image registration operation on the feature image to obtain at least one transformed image; and obtaining a mapping model based on the at least one transformed image. The feature image is an image which is shown on the display device and displays the at least one spot array.

18 Claims, 6 Drawing Sheets

(51) Int. Cl.
*G06T 7/00* (2017.01)
*G06F 3/14* (2006.01)
(52) U.S. Cl.
CPC ...... *G06T 7/97* (2017.01); *G06T 2207/30121* (2013.01)

(56) References Cited

FOREIGN PATENT DOCUMENTS

| CN | 107240127 A | 10/2017 |
| CN | 108205210 A | 6/2018 |

OTHER PUBLICATIONS

Bobo, Zho "Research on Point Defect Detection System Based on Small TFT-LCD", Chinese Master's Thesis Full Text Database Information Technology Series, Feb. 15, 2017.
Jinbo, Zhi "Basic theory of image registration based on local feature points", Chinese Master's Thesis Full Text Database Information Technology Series, Mar. 25, 2015, Chapter 2.
"Image registration establishes affine transformation model and uses RANSAC algorithm to evaluate" https://www.cnblogs/liguangsunis/p/6823269.html, May 8, 2017.
Third Chinese Office Action from Chinese Patent Application No. 201811276677.2 dated Jun. 9, 2021.
Fairylrt, web article (https://blog.csdn.net/fairylrt/article/details/38054857), Jul. 23, 2014.
Han et al., "New method of shape matching on detecting equipment of LCD display defect", Electronic Design Engineering, Dec. 12, 2012, pp. 1-4 and 7, vol. 20, No. 24.

\* cited by examiner

IMAGE REGISTRATION METHOD, IMAGE REGISTRATION DEVICE AND STORAGE MEDIUM

CROSS-REFERENCE TO RELATED APPLICATION

The present application claims priority to Chinese Patent Application No. 201811276677.2, filed on Oct. 30, 2018, entitled "IMAGE REGISTRATION METHOD, IMAGE REGISTRATION DEVICE AND STORAGE MEDIUM," the disclosure of which is incorporated herein by reference in its entirety as part of the present application.

TECHNICAL FIELD

The embodiments of the present disclosure relate to an image registration method, an image registration device, and a storage medium.

BACKGROUND

With the development of display technology, a display device has an increasingly high resolution, and the requirements for a manufacturing process of the display device and a defect detection during the production process are getting higher and higher. Therefore, there is also an increasingly urgent demand for using the machine vision technology to perform a high-efficiency, high-stability and high-accuracy online test on the display device.

Image registration is an important step in the defect detection of the display device. Usually, the image registration refers to a process of matching and superimposing two or more images obtained under different conditions (such as different imaging devices, different camera positions and angles, or the like), or a process of matching a sense image to another reference image. The technology of image registration not only may be applied to the defect detection of the display device, but also has found wide applications in fields of remote sensing, health care, computer vision, or the like.

SUMMARY

At least one embodiment of the present disclosure provides an image registration method, which includes:
causing a display device to display at least one spot array;
obtaining a feature image and performing a feature-based image registration operation on the feature image to obtain at least one transformed image; and
obtaining a mapping model based on the at least one transformed image,
wherein the feature image is an image which is shown on the display device and displays the at least one spot array.

For example, in the image registration method according to an embodiment of the present disclosure, the causing the display device to display the at least one spot array comprises:
causing the display device to display a plurality of spot arrays which have different sizes and are located in different display areas.

For example, in the image registration method according to an embodiment of the present disclosure, the obtaining the feature image and performing the feature-based image registration operation on the feature image to obtain the at least one transformed image comprises:
obtaining the feature image, and performing, on the feature image, spot array feature extracting, spot array feature matching and transformation model estimating to obtain a transformation model; and
performing image re-sampling and transforming on the feature image based on the transformation model to obtain at least one transformed image.

For example, in the image registration method according to an embodiment of the present disclosure, the performing, on the feature image, the spot array feature extracting, the spot array feature matching, and the transformation model estimating to obtain the transformation model comprises:
performing the spot array feature extracting on the feature image to obtain a feature of the feature image;
performing the spot array feature matching based on the feature of the feature image; and
performing the transformation model estimating based on a result of the spot feature matching, to obtain the transformation model.

For example, in the image registration method according to an embodiment of the present disclosure, the performing, on the feature image, the spot array feature extracting, the spot array feature matching, and the transformation model estimating to obtain the transformation model comprises:
capturing an image displayed by the display device by using an image capturing device to obtain the feature image; and
performing the spot array feature extracting, the spot array feature matching, and the transformation model estimating on each spot array in the feature image.

For example, in the image registration method according to an embodiment of the present disclosure, the spot array feature matching comprises:
matching a coordinate of a spot of the spot array in the feature image with a coordinate of a pixel or subpixel which emits light in the display device.

For example, in the image registration method according to an embodiment of the present disclosure, an imaging resolution of the image capturing device is greater than a display resolution of the display device.

For example, in the image registration method according to an embodiment of the present disclosure, the at least one spot array comprises a plurality of spot arrays, and
the performing the image re-sampling and transforming on the feature image based on the transformation model to obtain the at least one transformed image comprises:
obtaining a plurality of transformation models corresponding to the spot arrays in the feature image respectively based on the transformation model estimating, and performing the image re-sampling and transforming on the feature image by using the plurality of transformation models respectively to obtain a plurality of transformed images.

For example, in the image registration method according to an embodiment of the present disclosure, the obtaining the mapping model based on the at least one transformed image comprises:
performing a confidence level assessment on the plurality of transformed images, and selecting the transformation model corresponding to one of the plurality of transformed images based on a result of the confidence level assessment, as the mapping model.

For example, in the image registration method according to an embodiment of the present disclosure, the selecting the transformation model corresponding to one of the plurality of transformed images based on the result of the confidence level assessment, as the mapping model comprises:

calculating difference values between coordinates of all spots of spot arrays in each transformed image and coordinates of corresponding spots in the reference image, wherein the reference image is an original image which is displayed by the display device and comprises spot arrays;

calculating a variance of the difference values corresponding to each transformed image to obtain a plurality of variances corresponding to the plurality of transformed images respectively; and using the plurality of variances as an initial variance and performing a first operation based on the initial variance, wherein the first operation comprises:

comparing the initial variance with a preset value;

discarding the transformed image corresponding to at least one first variance of the initial variance, discarding, in a remaining transformed image of the plurality of transformed images, the spot array corresponding to the transformation model corresponding to the discarded transformed image, calculating difference values between coordinates of spots of a remaining spot array in the remaining transformed image and coordinates of corresponding spots in the reference image, calculating a variance of the difference values corresponding to each of the remaining transformed image, taking the calculated variance as the initial variance and performing the first operation, in a case where the at least one first variance of the initial variance is greater than a preset value; and selecting the transformation model corresponding to the transformed image corresponding to a minimal variance in the initial variance as the mapping model, in a case where each variance of the initial variances is less than or equal to the preset value.

For example, in the image registration method according to an embodiment of the present disclosure, in a case where the display device displays one spot array and one transformed image is obtained correspondingly, the obtaining the mapping model based on the at least one transformed image comprises:

taking the transformation model corresponding to the one transformed image as the mapping model.

For example, in the image registration method according to an embodiment of the present disclosure, each spot in the spot array is generated by a pixel or subpixel which emits light in the display device.

For example, in the image registration method according to an embodiment of the present disclosure, the spot array is arranged in a rectangle.

For example, in the image registration method according to an embodiment of the present disclosure, a size of the spot array in column×row is 2×2, 2×3, 3×3 or 4×4.

For example, the image registration method according to an embodiment of the present disclosure further includes: aligning a detection image shown on the display device with a reference image based on the mapping model.

At least one embodiment of the present disclosure further provides an image registration device, which includes:

a display control unit, configured to cause the display device to display at least one spot array;

an image registration operation executing unit, configured to obtain a feature image, and perform a feature-based image registration operation on the feature image to obtain at least one transformed image; and a mapping model obtaining unit, configured to obtain a mapping model based on the at least one transformed image, wherein the feature image is an image which is shown on the display device and displays the at least one spot array.

At least one embodiment of the present disclosure further provides an image registration device, which includes:

a processor;

a storage; and one or more computer program modules, the one or more computer program modules being stored in the storage and configured to be executed by the processor, and the one or more computer program modules comprising instructions configured for implementing the image registration method according to any embodiment of the present disclosure.

At least one embodiment of the present disclosure further provides a non-transient storage medium configured for storing computer readable instructions which, when executed by a computer, cause the computer to execute the image registration method according to any embodiment of the present disclosure.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

Figure 1:
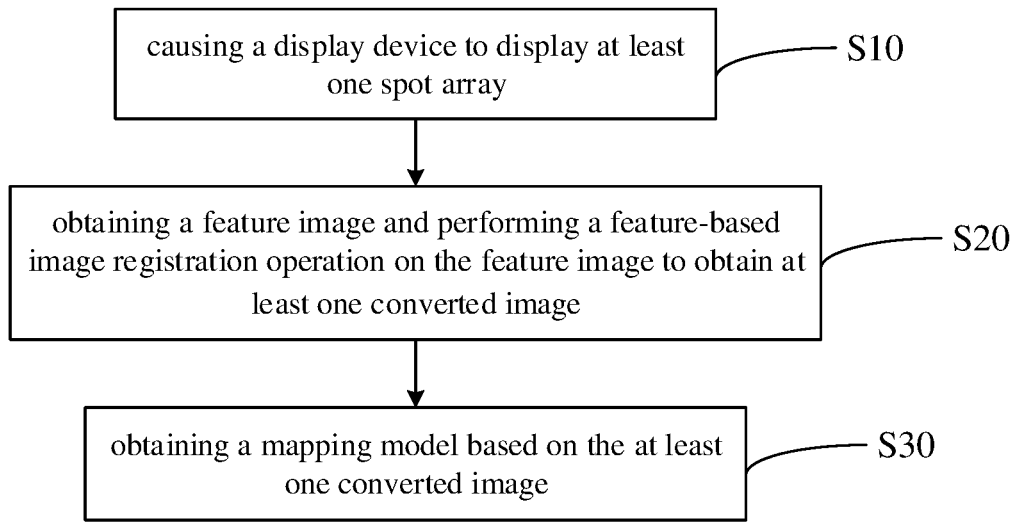
FIG. 1 is a schematic flow chart of an image registration method according to at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As an important step in the defect detection of a display device, image registration aligns a detection image with a reference image by using a mapping model, so as to perform the defect detection on the display device. For example, the mapping model refers to a mapping function of the detection image and the reference image, i.e., a coordinate transformation relation between the detection image and the reference image. Whether the mapping model is reasonable and accurate has a relatively great influence on the result of the defect detection of the display device. With the increasingly high resolution of the display device, it is an urgent problem of how to obtain and use a more reasonable and accurate mapping model to align the detection image, thereby implementing an alignment with a pixel-level accuracy between the detection image and the reference image, so as to improve the accuracy of the defect detection.

At least one embodiment of the present disclosure provides an image registration method, an image registration device and a storage medium. With this image registration method, image registration with a pixel-level accuracy may be implemented during the pixel defect detection process of the display device, and the image registration possesses high accuracy and high robustness, thereby supporting the pixel defect detection of the display device.

Hereinafter, the embodiments of the present disclosure will be described in detail with reference to the accompany drawings. It should be noted that throughout different drawings, like reference numerals refer to the same described elements.

At least one embodiment of the present disclosure provides an image registration method, including: causing a display device to display at least one spot array; obtaining a feature image, and performing an image registration operation on the feature image based on a feature to obtain at least one transformed image; obtaining a mapping model based on the at least one transformed image. Herein, the feature image is an image which is shown on the display device and displays the at least one spot array.

FIG. 1 is a schematic flow chart of an image registration method according to at least one embodiment of the present disclosure. As shown in FIG. 1, the image registration method includes the following steps:

step S10: causing a display device to display at least one spot array;

step S20: obtaining a feature image and performing a feature-based image registration operation on the feature image to obtain at least one transformed image;

step S30: obtaining a mapping model based on the at least one transformed image.

For example, in step S10, as the display device, an organic light emitting diode (OLED) display panel, an OLED display device, a liquid crystal display (LCD) panel, an LCD device, an electronic paper display device, or the like may be used, or other any component or device with a display function may also be used, and the embodiments of the present disclosure are not limited thereto. For example, the display device is the device which is required to be subject to pixel defect detection subsequently.

For example, the spot array may be formed by enabling a pixel(s) or a subpixel(s) at a specific position in the display device to emit light. At this point, pixels or subpixels at other positions in the display device do not emit light. Each of the pixels includes, for example, 3 subpixels (for example, RGB subpixels) or 4 subpixels (for example, RGBW subpixels or RGBY subpixels). The spot array includes a plurality of spots, each of which is a pixel or subpixel, or a plurality of adjacent pixels or subpixels. The number and size of the spot array are not limited, and may be determined based on actual requirements. The spot array will be described in detail hereinafter.

The feature image is an image which is shown on the display device and displays the at least one spot array. For example, in some embodiments, in step S20, the feature image is a captured image of an image which is displayed by the display device and includes the spot array. For example, the image which is displayed by the display device and includes the spot array may be captured using an image capturing device (for example, a camera), thereby obtaining the feature image, and this feature image also includes the spot array. Taking the spot array in the feature image as a feature, the feature-based image registration operation is performed on the feature image, thereby obtaining at least one transformed image. For example, the image registration operation includes a conventional image registration step, for example, including feature extracting, feature matching, transformation model estimating, image re-sampling and transforming, or the like. Since in this feature image, the spot array is taken as the feature, more specific, feature extracting is extracting the spot array feature, and feature matching is matching the spot array feature. At least one transformed image may be obtained by the image registration operation. For example, the transformed image is the image obtained by performing the image registration operation on the feature image.

For example, the number of transformed images is equal to the number of spot arrays. When there are a plurality of spot arrays, the image registration operation is performed on the feature image based on each of the spot arrays respectively, thereby obtaining a plurality of transformed images, and the number of the plurality of transformed images is equal to the number of spot arrays; when there is a single spot array, the image registration operation is performed on the feature image based on the single spot array, thereby obtaining one transformed image.

For example, in step S30, a confidence level assessment may be performed on the transformed image, thereby obtaining a mapping model. The confidence level assessment will be described in detail hereinafter. For example, in the case where this image registration method is applied to the pixel defect detection of the display device, this mapping model is a mapping function of the detection image and the corresponding reference image, i.e., a coordinate transformation relation between the detection image and the corresponding reference image. With this mapping model, image registration may be performed on any detection image and the corresponding reference image, thereby facilitating the subsequent pixel defect detection. Herein, the detection image refers to the captured image of an image displayed by the display device, this image displayed by the display device may or may not include the spot array, and the content presented by the image displayed by the display device may be determined based on the demands in pixel defect detection. The reference image refers to an original image displayed by the display device, i.e., a theoretically displayed image. For example, the reference image may be transmitted to the display device, converted into corresponding RGB (red, green, blue) data signal by the display device, and displayed based on the RGB data signal corresponding to the reference image.

Since the display content of the display device is controllable, the display device may display the spot array, and the spot array is taken as a feature, so that in this image registration method, the image registration with a pixel-level accuracy may be implemented during the pixel defect detection process of the display device, and a high accuracy is realized. A redundancy design is made using a plurality of spot arrays, so that this image registration method has a high robustness, and is not affected by defects (such as a bright spot, dust, stains, or the like) of the display device itself. With this image registration method, the subsequent pixel defect detection of the display device is supported, and the accuracy of the result of pixel defect detection is improved.

Figure 2:
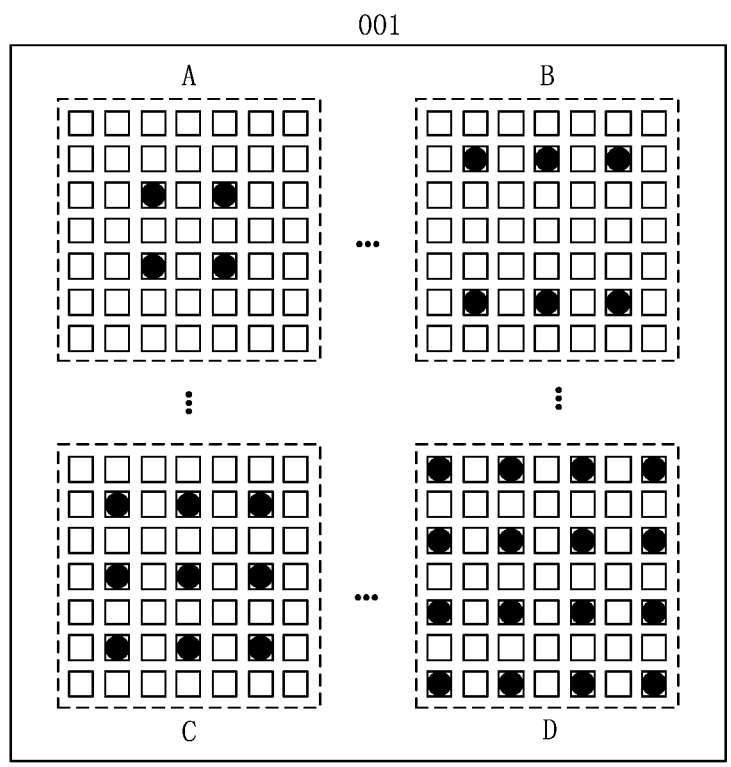
FIG. 2 is a schematic diagram of a spot array in an image registration method according to at least one embodiment of the present disclosure.

FIG. 2 is a schematic diagram of a spot array in an image registration method according to at least one embodiment of the present disclosure. For example, the display device may display a plurality of spot arrays which have different sizes and are located in different display areas. For example, in an example, as shown in FIG. 2, a display screen 001 of the display device includes a plurality of display areas, for example, including a first display area A, a second display area B, a third display area C and a fourth display area D. In the display areas, the spot arrays with different sizes are displayed respectively, and each of the spot arrays is in a rectangular arrangement. For example, a first spot array with a size of 2×2 is displayed in the first display area A; a second spot array with a size of 2×3 is displayed in the second display area B; a third spot array with a size of 3×3 is displayed in the third display area C; a fourth spot array with a size of 4×4 is displayed in the fourth display area D. Herein, the size of the spot array refers to the numbers of spots in each column and each row of the spot array in the rectangular arrangement. It should be noted that the size of the spot array is not limited, may also be, for example, 3×4, 2×5, 5×5 or the like, and may be determined based on actual requirements. The distance between spots in the spot array is not limited and may be determined based on actual requirements, for example, based on the number of spots and the size of the display area. For example, the spot array is not limited to a regular m×n array, and may also be an irregular array, such as an array in which adjacent rows are staggered in the column direction (so adjacent spots in adjacent rows are arranged in a shape of Δ).

For example, each of the spots in the spot array is a pixel or subpixel which emits light in the display device, or a plurality of adjacent pixels or subpixels which emit light. For example, the spot array may be formed by enabling the pixel(s) or subpixel(s) at a specific position in the display device to emit light. At this point, the pixels or subpixels at other positions in the display device do not emit light. Certainly, the embodiments of the present disclosure are not limited thereto. In other examples, the pixel or subpixel at the specific position in the display device may not emit light, but other pixels or subpixels at other positions emit light, thereby forming a spot array.

Figure 3:
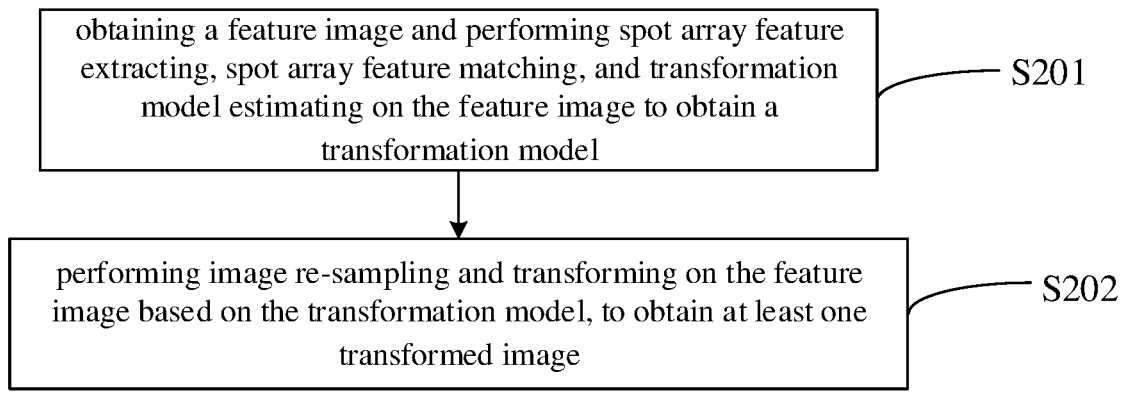
FIG. 3 is a flow chart of step S20 in the image registration method according to at least one embodiment of the present disclosure.

It should be noted that in the embodiments of the present disclosure, the number of spot arrays is not limited, and may be 4 shown in FIG. 2, or 1, 2, 3 or any number. The distribution position of the spot arrays is also not limited, and the spot arrays may be distributed evenly or unevenly in the display screen 001.

FIG. 3 is a flow chart of step S20 in the image registration method according to at least one embodiment of the present disclosure. As shown in FIG. 3, the step S20 in FIG. 1 may include the following steps:

step S201: obtaining a feature image and performing spot array feature extracting, spot array feature matching, and transformation model estimating on the feature image to obtain a transformation model;

step S202: performing image re-sampling and transforming on the feature image based on the transformation model, to obtain at least one transformed image.

Figure 4:
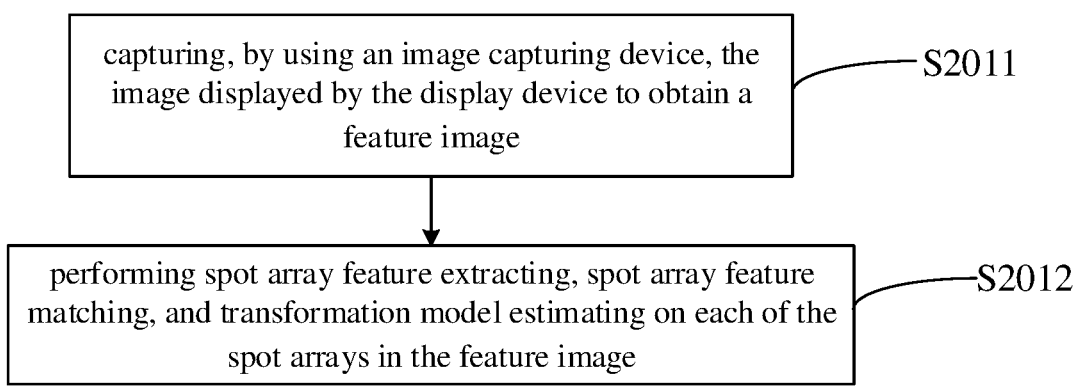
FIG. 4 is a flow chart of step S201 in the image registration method according to at least one embodiment of the present disclosure.

For example, in step S201, the feature image is a captured image of an image which is displayed by the display device and includes a spot array, for example, the captured image of the image shown in FIG. 2. In spot array feature extracting, spot array feature matching and transformation model estimating, the spot array may be taken as a feature, and spot array feature extracting, spot array feature matching and transformation model estimating are implemented by conventional feature extracting, feature matching and transformation model estimating methods. For example, in an example, as shown in FIG. 4, step S201 may include the following steps:

step S2011: capturing the image displayed by the display device by using an image capturing device to obtain a feature image;

step S2012: performing spot array feature extracting, spot array feature matching and transformation model estimating on each of the spot arrays in the feature image.

For example, in step S2011, the display device displays the image including the spot arrays, for example, the image as shown in FIG. 2, and the image is captured by the image capturing device to obtain the feature image. Thus, the feature image also includes corresponding plural spot arrays. For example, the image capturing device may be a digital camera, a digital video camera, or the like. For example, a complementary metal-oxide-semiconductor (CMOS) image sensor, a charge-coupled device (CCD) image sensor, or the like may be used, the resolution of the image sensor may be selected as required, and the embodiments of the present disclosure are not limited thereto.

For example, in order to implement pixel-level feature extracting and feature matching, the imaging resolution of the image capturing device is required to be greater than a display resolution of the display device. For example, in an example, the imaging resolution of the image capturing device is greater than or equal to four times the display resolution of the display device, so as to facilitate subsequent feature extracting and feature matching on the feature image.

For example, in step S2012, spot array feature extracting, spot array feature matching and transformation model estimating are performed on each of the spot arrays in the feature image. For example, in an example, when the display device displays the image as shown in FIG. 2, correspondingly, the captured feature image also includes four spot arrays, i.e., the feature image also includes first, second, third and fourth spot arrays. Each of the four spot arrays is taken as a feature, and correspondingly, spot array feature extracting, spot array feature matching and transformation model estimating are performed correspondingly, thereby obtaining four transformation models. These four transformation models correspond to four spot arrays respectively. For example, the four transformation models include first, second, third and fourth transformation models. The first transformation model is obtained based on the first spot array in the feature image, the second transformation model is obtained based on the second spot array in the feature image, the third transformation model is obtained based on the third spot array in the feature image, and the fourth transformation model is obtained based on the fourth spot array in the feature image.

For example, spot array feature extracting may be performed by adopting a watershed detection method based on a local extremum or a detection method based on a differential detector. Compared with other detection methods, the above-mentioned two detection methods are more suitable for the spot feature detection in the image. For example, the detection method based on the differential detector may include a Laplace of Gaussian (LOG) operator spot detection method in which by performing a convolution operation on the image with a LOG function, a singular region similar to the feature in the image is obtained as the spot feature. For example, in the watershed detection method based on the local extremum, by performing a multi-spacer-region binarization operation on the image, and extracting connected domains and connected central points, the spot feature and the corresponding radius are estimated.

For example, in an example, the watershed detection method based on the local extremum includes the following steps:
(1) setting a range of a binary threshold and a step value, and binarizing the image in sequence based on thresholds selected in the threshold range;
(2) extracting a contour in the binary image and calculating a center of each contour;
(3) performing grouping based on a coordinate of the center of the contour, and classifying the feature centers with a distance less than a judging value into the same feature point set;
(4) performing feature parameter screening on detected feature points, to confirm whether it is a to-be-detected spot, the feature parameters including a gray scale, an area, a roundness, or the like of the feature point.

It should be noted that in the embodiments of the present disclosure, spot array feature extracting may be performed using the above-mentioned methods, or algorithms such as Scale-invariant Feature Transform (SIFT), harris corner detection, Speeded Up Robust Features (SURF), or the like or other suitable methods, and the embodiments of the present disclosure are not limited thereto, so long as the spot array may be detected. The detailed explanation about spot array feature extracting may refer to conventional feature extracting methods, and is not described in detail herein.

For example, spot array feature matching includes: matching the coordinate of the spot of the spot array in the feature image with the coordinate of the pixel or subpixel which emits light in the display device. Since the display device displays images based on the RGB data signal corresponding to the reference image, the coordinate of the pixel or subpixel which emits light in the display device is the same as the coordinate of the spot of each spot array in the reference image. Thus, feature matching between the feature image and the reference image may be implemented. The detailed explanation about spot array feature matching may refer to conventional feature matching methods, and is not described in detail herein.

For example, in conventional image registration methods, the conventional feature image adopts a checkerboard pattern, and feature matching is performed by detecting an inner corner point of the checkerboard as the feature point. However, for the display device, since the display device displays images through a pixel array, the presence of a light diffusion effect of the pixel point and a black matrix (BM) region would affect the detection accuracy of the inner corner point of the checkerboard. In the image registration method according to the embodiments of the present disclosure, the pixel point of the display device emitting light is taken as the feature to be detected, different spot arrays are generated as required, and feature matching is implemented by extracting the spot array in the feature image and matching the spot array with the position (coordinate) of the pixel or subpixel which emits light actually. Since the spot array constituted by the pixel or subpixel of the display device is taken as the feature to be detected, pixel-level feature extracting and feature matching may be implemented, thereby implementing the pixel-level image registration with a high alignment accuracy.

For example, transformation model estimating may adopt a perspective transformation model having wide applicability, or any suitable transformation model such as a rigid transformation model, a similarity transformation model, an affine transformation model, or the like, and the embodiments of the present disclosure are not limited thereto. For example, in an example, when the display device displays the image as shown in FIG. 2 and the corresponding feature image is captured and obtained, the first, second, third and fourth transformation models may be obtained based on the first, second, third and fourth spot arrays in the feature image respectively. The four transformation models may describe the relation between the feature image and the reference image, such as translation, rotation, scaling, or the like. The description of transformation model estimating may refer to the conventional transformation model estimating method, and is not described in detail herein.

For example, in step S202 shown in FIG. 3, a plurality of transformation models each corresponding to one the spot arrays in the feature image may be obtained based on transformation model estimating, and image re-sampling and transforming are performed on the feature image by using the plurality of transformation models respectively, to obtain a plurality of transformed images. For example, in an example, after the first, second, third and fourth transformation models are obtained, image re-sampling and transforming are performed on the feature image by using each of the transformation models respectively, thereby obtaining the first, second, third and fourth transformed images corresponding to the four transformation models respectively. The first, second, third and fourth transformed images are all obtained by the deformation of the feature image, and there may be a delicate difference therebetween. The description of image re-sampling and transforming may refer to the conventional image re-sampling and transforming, and is not described in detail herein.

Figure 5:
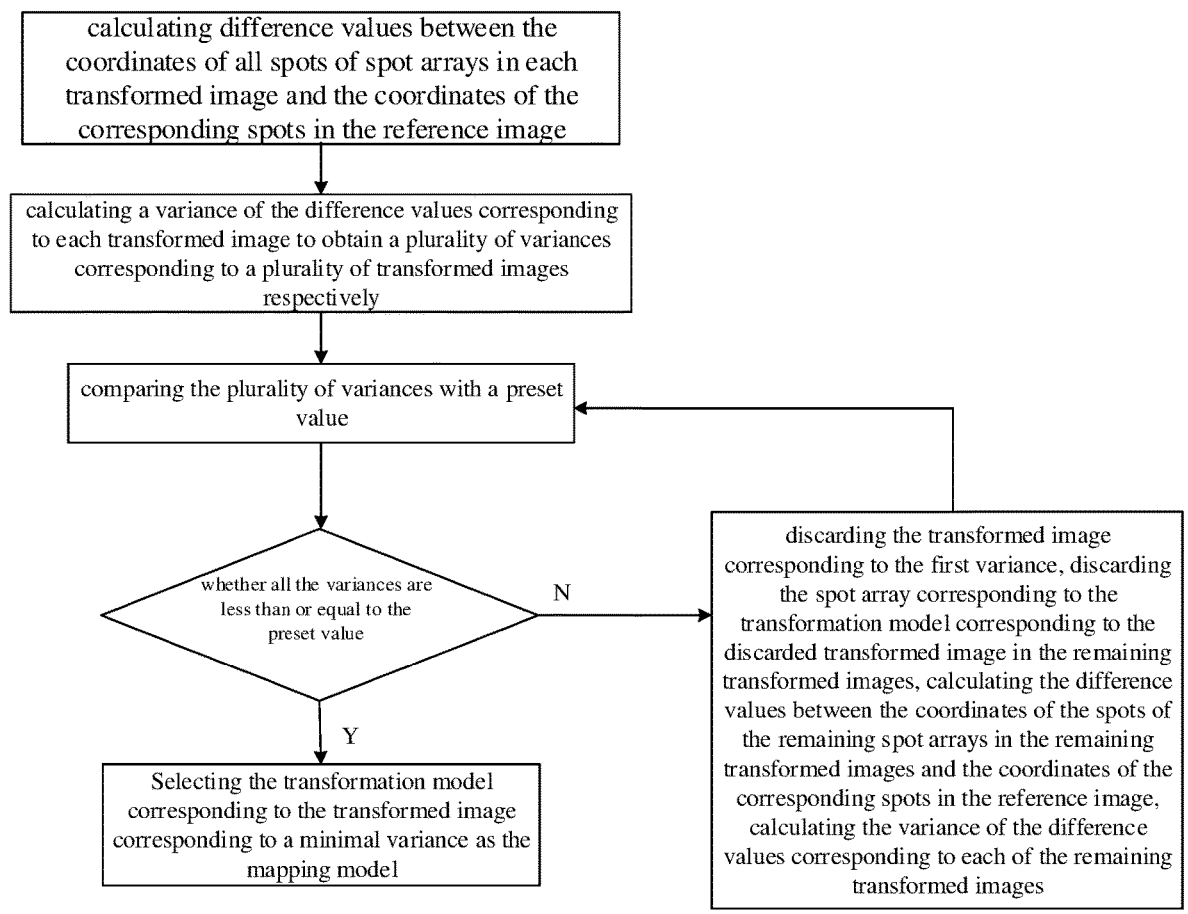
FIG. 5 is a flow chart of a confidence level assessment in the image registration method according to at least one embodiment of the present disclosure.

For example, after the transformed image is obtained, the confidence level assessment may be performed on the transformed image to obtain the mapping model. That is, an example of step S30 shown in FIG. 1 may particularly include: performing a confidence level assessment on a plurality of transformed images, and selecting a transformation model corresponding to one of the plurality of transformed images based on the result of the assessment, as the mapping model. FIG. 5 is a flow chart of a confidence level assessment in the image registration method according to at least one embodiment of the present disclosure. For example, in an example, as shown in FIG. 5, the confidence level assessment may include the following steps.

Firstly, difference values between the coordinates of all spots of spot arrays in each transformed image and the coordinates of the corresponding spots in the reference image are calculated. Herein, the reference image refers to the original image which is displayed by the display device and includes the spot array, i.e., the image transmitted to the display device. For example, in an example, the display device displays the image as shown in FIG. 2, so each of the transformed images includes 35 spots, and the 35 spots correspond to the four spot arrays. For example, for the first transformed image, 35 difference values $\Delta M_i$ are obtained, where i=1, ..., 35; for the second transformed image, 35 difference values $\Delta N_i$ are obtained; for the third transformed image, 35 difference values $\Delta P_i$ are obtained; for the fourth transformed image, 35 difference values $\Delta Q_i$ are obtained. For example, the difference value may be a matrix including the differences of the coordinates in the horizontal direction (X direction) and the perpendicular direction (Y direction), or a half power of a sum of squares of the differences of the coordinates in the horizontal and perpendicular directions, and the embodiments of the present disclosure are not limited thereto.

Secondly, a variance of the difference values corresponding to each transformed image is calculated to obtain a plurality of variances corresponding to a plurality of transformed images respectively. For example, for the first transformed image, the variance of 35 difference values $\Delta M_i$ is calculated, to obtain the variance $\sigma_A^2$ corresponding to the first transformed image; for the second transformed image, the variance of 35 difference values $\Delta N_i$ is calculated, to obtain the variance $\sigma_B^2$ corresponding to the second transformed image; for the third transformed image, the variance of 35 difference values $\Delta P_i$ is calculated, to obtain the variance $\sigma_C^2$ corresponding to the third transformed image; for the fourth transformed image, the variance of 35 difference values $\Delta Q_i$ is calculated, to obtain the variance $\sigma_D^2$ corresponding to the fourth transformed image.

Then, the plurality of variances is compared with a preset value, and it is judged whether the plurality of variances is all less than or equal to the preset value. For example, this preset value may be empirically determined, or may be a reference value obtained from theoretical calculation, and the embodiments of the present disclosure have no limitation in this aspect.

If not all the plurality of variances is less than or equal to the preset value, i.e., there is at least one variance greater than the preset value in the plurality of variances (the at least one variance greater than the preset value is referred to as a first variance), the transformed image corresponding to the first variance is discarded, the spot array corresponding to the transformation model corresponding to the discarded transformed image in the remaining transformed images is discarded, the difference values between the coordinates of spots of the remaining spot arrays in the remaining transformed images and the coordinates of the corresponding spots in the reference image are calculated, the variance of the difference values corresponding to each of the remaining transformed images is calculated, and the calculated variance is compared with the preset value.

For example, in an example, if the variance $\sigma_A^2$ corresponding to the first transformed image is greater than the preset value, the accuracy of the first transformation model corresponding to the first transformed image does not meet requirements, so the first transformed image is discarded. Since the first transformation model is obtained based on the first spot array, it is indicated that the first spot array may be affected by bright spots, dust and stains, the four spots of the first spot array in the second, third and fourth transformed images should also be discarded. Then, the difference values between the coordinates of the 31 spots remaining in each of the second, third and fourth transformed images and the coordinate of the corresponding spot in the reference image are calculated respectively, the variances are calculated based on the 31 difference values corresponding to each of the second, third and fourth transformed images, the three calculated variances are compared with the preset value, to repeat the above-mentioned step of judging whether the plurality of variances is all less than or equal to the preset value.

If the plurality of variances is all less than or equal to the preset value, the transformation model corresponding to the transformed image corresponding to a minimal variance is selected as the mapping model. For example, in an example, when the variances $\sigma_A^2$, $\sigma_B^2$, $\sigma_C^2$ and $\sigma_D^2$ corresponding to the first, second, third and fourth transformed images respectively are all less than or equal to the preset value, and $\sigma_D^2$ is the minimum, the fourth transformation model corresponding to the fourth transformed image corresponding to $\sigma_D^2$ is selected as the mapping model, so that this mapping model has a relatively high accuracy. For example, the mapping model obtained by this image registration method may be applied to the registration operation between any detection image and the corresponding reference image, thereby facilitating the subsequent pixel defect detection and contributing to the improvement of the detection accuracy.

Since the defects such as bright spots, dust and stains of the display device itself may cause interference to the displayed spot array, in the embodiments of the present disclosure, by redundantly designing a plurality of spot arrays, and performing the confidence level assessment on the plurality of obtained transformation models, the final mapping model has a relatively high accuracy, robustness is effectively improved and the adverse interference from the display device itself is avoided.

It should be noted that in the embodiments of the present disclosure, when there are a plurality of spot arrays and a plurality of transformed images are obtained correspondingly, the above-mentioned confidence level assessment is performed on the plurality of transformed images, to obtain the mapping model; when there is one spot array and one transformed image is obtained correspondingly, the confidence level assessment may also be performed on the transformed image, or the confidence level assessment may not be performed, and the transformation model corresponding to this transformed image is directly taken as the mapping model. For example, in an example, in the case where the number of spot arrays is one and one transformed image is obtained correspondingly, when the confidence level assessment is performed on the transformed image and if the result of the assessment is not qualified, that is, the variance corresponding to the transformed image is greater than the preset value, the display device displays one spot array with a different size at a different position again, and individual steps in the image registration method are performed again, until the estimation result is qualified. For example, in another example, in the case where the number of spot arrays is one and one transformed image is obtained correspondingly, when the confidence level assessment is not performed on this transformed image, the step of image re-sampling and transforming may be omitted, and the transformation model obtained by transformation model estimating is taken as the mapping model directly.

It should be noted that in the embodiments of the present disclosure, the specific operation of the confidence level assessment is not limited to thereto, other methods or flows may be adopted, and the embodiments of the present disclosure have no limitation in this aspect.

The image registration method according to some embodiments of the present disclosure may further include: aligning the detection image shown on the display device with the reference image based on the mapping model. Similarly, the detection image shown on the display device may also be obtained by capturing the display device using the image capturing device (such as a camera). By aligning the detection image with the reference image based on the mapping model, the defect detection of the display device is performed.

Figure 6:
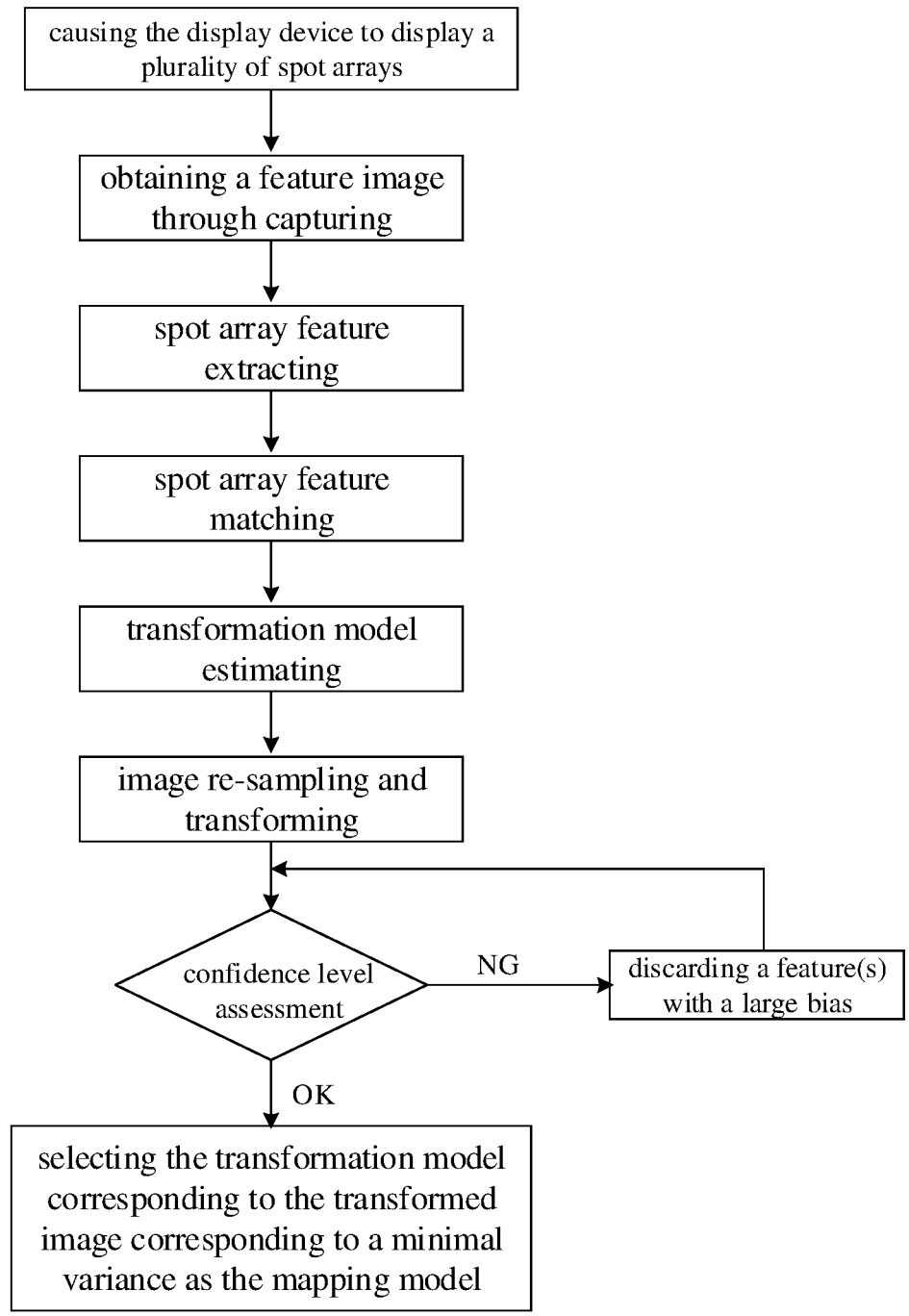
FIG. 6 is a particular flow chart of an image registration method according to at least one embodiment of the present disclosure.

FIG. 6 is a specific flow chart of an image registration method according to at least one embodiment of the present disclosure. For example, in an example, as shown in FIG. 6, the image registration method includes the following steps. Firstly, the display device displays a plurality of spot arrays which has different sizes and are located in different display areas. Then, the feature image is obtained by using an image capturing device to capture the plurality of spot arrays, and also includes a plurality of spot arrays. Next, spot array feature extracting, spot array feature matching and transformation model estimating are performed on each of the spot arrays in the feature image, and image re-sampling and transforming is performed on the feature image according to a plurality of obtained transformation models, to obtain a plurality of transformed images. Afterwards, the confidence level assessment is performed on the plurality of transformed images. If the estimation result is not qualified, that is, among the plurality of variances, there is at least one first variance greater than the preset value, the spot array feature with a large bias is discarded (that is, the spot array corresponding to the transformation model corresponding to the transformed image corresponding to the first variance is discarded), and the confidence level assessment is resumed. If the estimation result is qualified, that is, the plurality of variances is less than or equal to the preset value, the transformation model corresponding to the transformed image corresponding to the minimal variance is selected as the mapping model.

It should be noted that in the embodiments of the present disclosure, the order of executing various steps of the image registration method is not limited. Although the process of executing various steps is described in a particular order in the foregoing, it is not limitative of the embodiments of the present disclosure. The image registration method may further include more or less steps, and the embodiments of the present disclosure have no limitation in this aspect.

At least one embodiment of the present disclosure further provides an image registration device. With this image registration device, for example, during the process of pixel defect detection of the display device, the image registration with a pixel-level accuracy may be implemented with high accuracy and robustness, thereby supporting the pixel defect detection of the display device.

Figure 7:
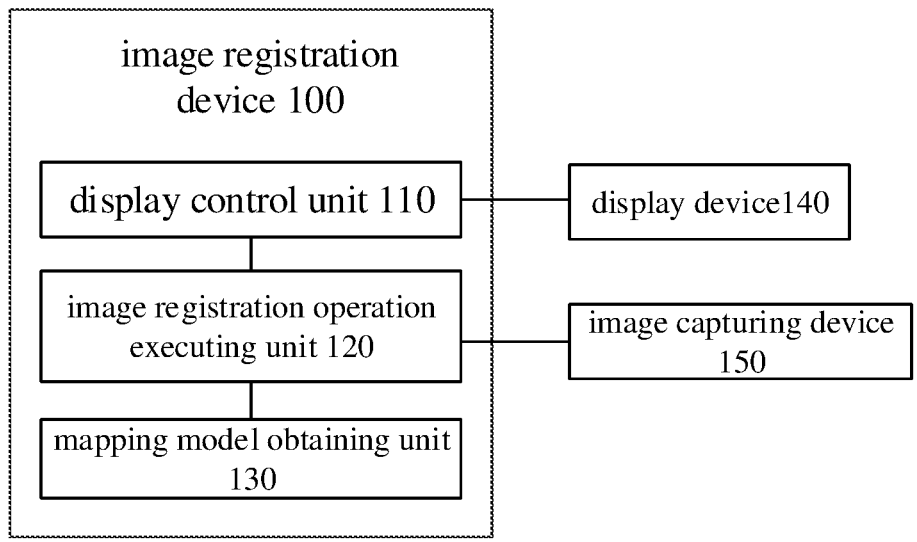
FIG. 7 is a schematic block diagram of an image registration device according to at least one embodiment of the present disclosure.

FIG. 7 is a schematic block diagram of an image registration device according to at least one embodiment of the present disclosure; As shown in FIG. 7, the image registration device 100 may include a display control unit 110, an image registration operation executing unit 120 and a mapping model obtaining unit 130. The image registration device 100, for example, is in signal connection (for example, through a wired or wireless connection) with the display device 140, and the reference image may be transmitted to the display device 140, so that the display device 140 displays the corresponding image. The image registration device 100 is also in signal connection (for example, through a wired or wireless connection) with the image capturing device 150, and the image registration device 100 is configured for obtaining an image of the image displayed by the display device 140, which is captured by the image capturing device 150. For example, the image registration device 100 may further transmit a control command to the image capturing device 150 to control the image capturing device 150 to execute the capturing operation.

The display control unit 110 is configured to cause the display device to display at least one spot array. The image registration operation executing unit 120 is configured to obtain a feature image, and perform a feature-based image registration operation on the feature image to obtain at least one transformed image. The mapping model obtaining unit 130 is configured to obtain the mapping model based on at least one transformed image.

For example, the image registration device 100 may be applied to the pixel defect detection device or system of the display device, or any device or system which requires to use the display device to display images and to perform image registration on a captured image of an image displayed by the display device, and the embodiments of the present disclosure have no limitation in this aspect.

For example, the display control unit 110, the image registration operation executing unit 120 and the mapping model obtaining unit 130 may be implemented in hardware, software, firmware, or any feasible combinations thereof. For example, the display control unit 110, the image registration operation executing unit 120 and the mapping model obtaining unit 130 may be dedicated or general purpose circuits, chips, devices, or the like, or the combination of a processor and a storage. For example, in an example, each unit may further include a signal transceiver, a modem, a storage device, or the like. The specific implementations of the display control unit 110, the image registration operation executing unit 120 and the mapping model obtaining unit 130 are not limited in the embodiments of the present disclosure.

For example, the display device 140 may be an OLED display panel, an OLED display device, a LCD panel, a LCD device, or any other components or devices with a display function, and the embodiments of the present disclosure have no limitation in this aspect. The image capturing device 150 may be a digital camera, a digital video camera, or the like, and the embodiments of the present disclosure have no limitation in this aspect.

When provided in the same system, the above-mentioned image registration device 100, the display device 140 and the image capturing device 150 may be in signal connection with one another through a system bus, so as to rapidly transmit data.

It should be noted that in the embodiments of the present disclosure, the individual units of the image registration device 100 corresponds to the individual steps of the above-mentioned image registration method. The specific function of the image registration device 100 may refer to the description related to the image registration method, and is not repeated herein. The components and structure of the image registration device 100 shown in FIG. 7 are merely exemplary, but not limitative. As required, this image registration device 100 may further include other components and structures.

Figure 8:
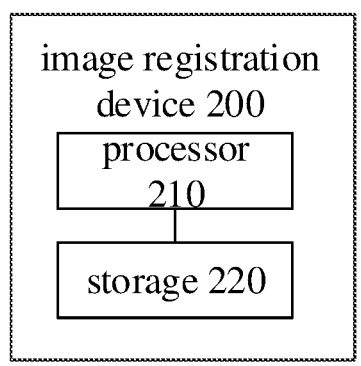
FIG. 8 is a schematic block diagram of another image registration device according to at least one embodiment of the present disclosure.

FIG. 8 is a schematic block diagram of another image registration device according to at least one embodiment of the present disclosure. As shown in FIG. 8, the image registration device 200 may include a processor 210 and a non-transient storage 220. The storage 220 is configured for storing computer readable instructions (for example, one or more computer program modules). The processor 210 is configured for executing the computer readable instructions which, when executed by the processor 210, cause the processor 210 to execute one or more steps in the above-mentioned image registration method. The storage 220 and the processor 210 may be connected through a bus system and/or a connection mechanism in other forms (not shown).

For example, the storage 220 and the processor 210 may be provided at a server side (or cloud). Certainly, the embodiments of the present disclosure are not limited thereto, and the storage 220 and the processor 210 may also be provided at a client terminal.

For example, the processor 210 may be a central processing unit (CPU), a digital signal processor (DSP) or a processing unit in other forms with a data processing ability and/or program executing ability, for example, a field programmable gate array (FPGA), or the like. For example, the CPU may adopt the X86 architecture, the ARM architecture, or the like. The processor 210 may be a general purpose or dedicated processor, and control other components in the image registration device 200 to perform the required function.

For example, the storage 220 may include any combination of one or more computer program products which may include various computer readable storage mediums, for example, volatile storage and/or non-volatile storage. The volatile storage may include a random access memory (RAM) and/or a cache, or the like. The non-volatile storage may include a read-only memory (ROM), a hard disk, an erasable programmable read-only memory (EPROM), a portable compact disk read-only memory (CD-ROM), a USB storage, flash memory, or the like. One or more computer program modules may be stored on the computer readable storage medium, and the processor 210 may execute one or more computer program modules to implement various functions of the image registration device 200. Various applications and data as well as various data used and/or generated by applications, or the like may also be stored in the computer readable storage medium.

For example, in an example, the reference image may be transmitted to the display device 140 (not shown in FIG. 8) based on a corresponding communication protocol via a communication network (such as a wired local area network, a wireless local area network, 3G/4G/5G communication networks, Bluetooth, or the like), and an image of the feature image captured by the image capturing device 150 (not shown in FIG. 8) is received. For example, the communication protocol may be any suitable communication protocol such as a Bluetooth communication protocol, an Ethernet, a serial interface communication protocol, a parallel interface communication protocol, or the like, and the embodiments of the present disclosure have no limitation in this aspect. The image registration device 200 may be communicated with the display device 140 and the image capturing device 150 in a wired or wireless manner. It should be noted that in the embodiments of the present disclosure, the specific functions and technical effects of the image registration device 200 may refer to the above descriptions about the image registration method, and are not repeated herein.

At least one embodiment of the present disclosure further provides a non-transient storage medium configured for storing computer readable instructions which, when executed by a computer, cause the computer to execute the instructions implementing the image registration method according to any one of the above-mentioned embodiments of the present disclosure. With this storage medium, for example, during the process of pixel defect detection of the display device, image registration with a pixel-level accuracy may be implemented with high accuracy and robustness, thereby supporting the pixel defect detection of the display device.

Figure 9:
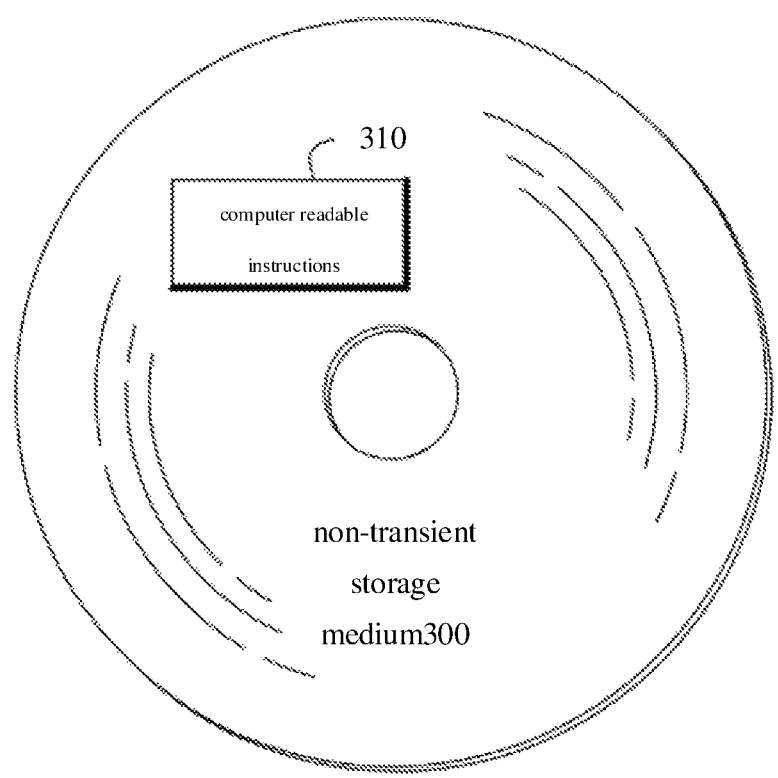
FIG. 9 is a schematic diagram of a storage medium according to at least one embodiment of the present disclosure.

FIG. 9 is a schematic diagram of a non-transient storage medium according to at least one embodiment of the present disclosure. As shown in FIG. 9, the storage medium 300 is configured for storing computer readable instructions 310 which, when executed by a computer, cause the computer to execute one or more steps of the above-mentioned image registration method.

For example, the storage medium 300 may be applied to the above-mentioned image registration device 200. For example, the storage medium 300 may be the storage 220 in the image registration device 200 shown in FIG. 8. For example, the description about the storage medium 300 may refer to the corresponding description related to the storage 200 in the image registration device 200 shown in FIG. 8, and is not repeated herein.

The following statements should be noted:

(1) The accompanying drawings involve only the structure(s) in connection with the embodiment(s) of the present disclosure, and other structure(s) can be referred to common design(s).

(2) In case of no conflict, the embodiments or features in the embodiments of the present disclosure can be combined to obtain new embodiments.

The foregoing merely are exemplary embodiments of the disclosure, and not intended to define the scope of the disclosure, and the scope of the disclosure is determined by the appended claims.

What is claimed is:

1. An image registration method, comprising:
  causing a display device to display at least one spot array;
  obtaining a feature image and performing a feature-based image registration operation on the feature image to obtain at least one transformation model, so as to obtain at least one transformed image based on the at least one transformation model; and
  obtaining a mapping model from the at least one transformation model based on the at least one transformed image,
  wherein the feature image is an image which is shown on the display device and displays the at least one spot array, and the mapping model is configured for aligning a detection image shown on the display device with a reference image corresponding to the detection image.

2. The image registration method according to claim 1, wherein the causing the display device to display the at least one spot array comprises:
  causing the display device to display a plurality of spot arrays which have different sizes and are located in different display areas.

3. The image registration method according to claim 2, wherein the obtaining the feature image and performing the feature-based image registration operation on the feature image to obtain the at least one transformation model, so as to obtain the at least one transformed image based on the at least one transformation model comprises:

obtaining the feature image, and performing, on the feature image, spot array feature extracting, spot array feature matching, and transformation model estimating to obtain the at least one transformation model; and performing image re-sampling and transforming on the feature image based on the at least one transformation model to obtain the at least one transformed image.

4. The image registration method according to claim 3, wherein the performing, on the feature image, the spot array feature extracting, the spot array feature matching, and the transformation model estimating to obtain the at least one transformation model comprises:

performing the spot array feature extracting on the feature image to obtain a feature of the feature image;

performing the spot array feature matching based on the feature of the feature image; and performing the transformation model estimating based on a result of the spot feature matching, to obtain the at least one transformation model.

5. The image registration method according to claim 3, wherein the performing, on the feature image, the spot array feature extracting, the spot array feature matching, and the transformation model estimating to obtain the at least one transformation model comprises:

capturing an image displayed by the display device by using an image capturing device to obtain the feature image; and performing the spot array feature extracting, the spot array feature matching, and the transformation model estimating on each spot array in the feature image.

6. The image registration method according to claim 5, wherein the spot array feature matching comprises:

matching a coordinate of a spot of the spot array in the feature image with a coordinate of a pixel or subpixel which emits light in the display device.

7. The image registration method according to claim 5, wherein an imaging resolution of the image capturing device is greater than a display resolution of the display device.

8. The image registration method according to claim 3, wherein the at least one spot array comprises a plurality of spot arrays, and the performing the image re-sampling and transforming on the feature image based on the at least one transformation model to obtain the at least one transformed image comprises:

obtaining a plurality of transformation models corresponding to the spot arrays in the feature image respectively based on the transformation model estimating, and performing the image re-sampling and transforming on the feature image by using the plurality of transformation models respectively to obtain a plurality of transformed images.

9. The image registration method according to claim 8, wherein the obtaining the mapping model from the at least one transformation model based on the at least one transformed image comprises:

performing a confidence level assessment on the plurality of transformed images, and selecting the transformation model corresponding to one of the plurality of transformed images based on a result of the confidence level assessment, as the mapping model.

10. The image registration method according to claim 9, wherein the selecting the transformation model corresponding to one of the plurality of transformed images based on the result of the confidence level assessment, as the mapping model comprises:

calculating difference values between coordinates of all spots of spot arrays in each transformed image and coordinates of corresponding spots in the reference image, wherein the reference image is an original image which is displayed by the display device and comprises spot arrays;

calculating a variance of the difference values corresponding to each transformed image to obtain a plurality of variances corresponding to the plurality of transformed images respectively; and using the plurality of variances as an initial variance and performing a first operation based on the initial variance, wherein the first operation comprises:

comparing the initial variance with a preset value;

discarding the transformed image corresponding to at least one first variance of the initial variances, discarding, in a remaining transformed image of the plurality of transformed images, the spot array corresponding to the transformation model corresponding to the discarded transformed image, calculating difference values between coordinates of spots of a remaining spot array in the remaining transformed image and coordinates of corresponding spots in the reference image, calculating a variance of the difference values corresponding to each of the remaining transformed image, taking the calculated variance as the initial variance and performing the first operation, in a case where the at least one first variance of the initial variance is greater than a preset value; and selecting the transformation model corresponding to the transformed image corresponding to a minimal variance in the initial variance as the mapping model, in a case where each variance of the initial variance is all less than or equal to the preset value.

11. The image registration method according to claim 1, wherein in a case where the display device displays one spot array and one transformed image is obtained correspondingly, the obtaining the mapping model from the at least one transformation model based on the at least one transformed image comprises:

taking the transformation model corresponding to the one transformed image as the mapping model.

12. The image registration method according to claim 1, wherein each spot in the spot array is generated by a pixel or subpixel which emits light in the display device.

13. The image registration method according to claim 1, wherein the spot array is arranged in a rectangle.

14. The image registration method according to claim 1, wherein a size of the spot array in column×row is 2×2, 2×3, 3×3 or 4×4.

15. The image registration method according to claim 1, further comprising:

aligning the detection image shown on the display device with the reference image based on the mapping model.

16. An image registration device, comprising:

a display control unit, configured to cause the display device to display at least one spot array;

an image registration operation executing unit, configured to obtain a feature image and perform a feature-based image registration operation on the feature image to obtain at least one transformation model, so as to obtain at least one transformed image based on the at least one transformation model; and a mapping model obtaining unit, configured to obtain a mapping model from the at least one transformation model based on the at least one transformed image, wherein the feature image is an image which is shown on the display device and displays the at least one spot array, and the mapping model is configured for aligning a detection image shown on the display device with a reference image corresponding to the detection image.

17. An image registration device, comprising:

a processor;

a storage; and one or more computer program modules, the one or more computer program modules being stored in the storage and configured to be executed by the processor, and the one or more computer program modules comprising instructions configured for implementing the image registration method according to claim 1.

18. A non-transient storage medium, configured for storing computer readable instructions, wherein the computer readable instructions, when executed by a computer, cause the computer to execute the image registration method according to claim 1.

* * * * *